United States Patent [19]

LoStracco et al.

[11] Patent Number: 5,594,829
[45] Date of Patent: Jan. 14, 1997

[54] OPTICAL FIBER DISPENSER WITH THERMAL EXPANSION ACCOMMODATION LAYER

[76] Inventors: Gregory LoStracco, 1926 N. Tucker Dr., Tucson, Ariz. 85716; Ronald B. Chesler, 80 N. Calle Primarosa, Tucson, Ariz. 85716-4936; Hui-Pin Hsu, 9360 Zelzah Ave., Northridge, Calif. 91325

[21] Appl. No.: 478,297

[22] Filed: Jun. 7, 1995

[51] Int. Cl.$^6$ .................................................. G02B 6/36
[52] U.S. Cl. .................................. 385/134; 385/147
[58] Field of Search ............... 244/3, 12; 156/172, 156/166, 167, 169, 156; 385/134, 137, 115, 12, 147, 123

[56] References Cited

U.S. PATENT DOCUMENTS 5,220,632  6/1993  LoStroacco ..................... 385/137
5,256,237  10/1993  Maas et al. ..................... 156/156

*Primary Examiner*—John Ngo
*Attorney, Agent, or Firm*—Charles D. Brown; Wanda K. Denson-Low

[57] ABSTRACT

An optical fiber dispenser (40) includes a bobbin (42), an optical fiber pack (52) overlying the bobbin (42), and a thermal expansion accommodation layer (50) positioned between the bobbin (42) and the optical fiber pack (52). The thermal expansion accommodation layer (50) is made of a material, such as a silicone elastomer, that is readily deformable to accommodate the different longitudinal coefficients of thermal expansion of the bobbin (42) and the optical fiber pack (52). The thermal expansion accommodation layer (50) has a thickness, typically more than about ⅛ inch for a conventional bobbin size, sufficient to reduce any thermal stresses produced by the different longitudinal coefficients of thermal expansion to less than the failure strength of the optical fiber pack (52).

15 Claims, 2 Drawing Sheets

OPTICAL FIBER DISPENSER WITH THERMAL EXPANSION ACCOMMODATION LAYER

BACKGROUND OF THE INVENTION

This invention relates to optical fiber technology and optical fiber dispensers, and, more particularly, to an optical fiber dispenser structured to minimize the adverse consequences of thermal expansion differences between the optical fiber pack and the bobbin.

Optical fibers are strands of glass fiber processed so that light transmitted therethrough is subject to total internal reflection. Glass optical fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the optical fiber plus the polymer buffer (sometimes termed an "optical fiber cable") is about 250 micrometers (approximately 0.010 inches).

For such very fine optical fibers, the handling of the optical fiber cable to avoid damage that might reduce its mechanical strength and/or light transmission properties becomes an important consideration. In one approach, the optical fiber cable is wound onto a cylindrical or tapered cylindrical bobbin (collectively termed herein a "tapered" cylindrical bobbin, even though the angle of the taper may be zero) with many turns adjacent to each other in a side-by-side fashion. After one layer is complete, another layer of optical fiber cable is wound on top of the first layer, and so on. A weak adhesive is typically applied to the layers of optical fiber cable, to hold them in place. The final assembly of the bobbin and the wound layers of optical fiber cable is termed a dispenser, and the mass of wound optical fiber cable is termed the fiber pack. When the optical fiber cable is later to be used, the optical fiber cable is paid out from the dispenser in a direction generally parallel to the axis of the tapered cylinder.

In general, the dispenser is prepared at one temperature, but subjected to other temperatures during storage, handling, and service. The bobbin and the optical fiber pack have different thermal expansion coefficients, and the resulting thermally induced strains and stresses can cause various defects in the dispenser as a result of temperature changes. The effective thermal expansion coefficient of the optical fiber pack is low in the circumferential direction, about the same as that of the glass in the optical fiber. The effective thermal expansion coefficient of the optical fiber pack is much higher in the longitudinal direction (parallel to the cylinder axis), about the same as that of the polymeric buffer material. The thermal expansion coefficient of the bobbin cannot be readily matched to this anisotropic state, so that thermal expansion mismatch in at least one direction is virtually inevitable.

A number of approaches have been proposed for avoiding or at least reducing the magnitude of the thermal expansion stresses in the dispenser. Such a reduction in thermally induced stresses can improve the life expectancy and the associated performance of the optical fiber dispenser by reducing the incidence of defects in the optical fiber pack. For various reasons, these approaches have not proved entirely successful. Accordingly, there remains a need for an improved approach to the construction of optical fiber dispensers to minimize the adverse effects of thermal expansion mismatches. The present invention fulfills this need, and further provides related advantages.

SUMMARY OF THE INVENTION

This invention provides an optical fiber dispenser and a method for its preparation. The optical fiber dispenser is forgiving of thermal expansion mismatches between the bobbin and the optical fiber pack. Strains which result from thermal expansion mismatch and other sources are accommodated, reducing the magnitude of stresses that are produced in the optical fiber pack. Consequently, defects such as fiber pack cracking and inelastic adhesive deformation are reduced and, desirably, avoided entirely. Expansion and contraction of the dispenser occur continuously and smoothly. Additionally, the approach of the invention can be used to control the stress state within the dispenser. The present approach can be used with a wide variety of bobbins and optical fiber cable types.

In accordance with the invention, an optical fiber dispenser comprises a bobbin, preferably in the form of a tapered cylinder, having an outer surface, and an optical fiber pack having an inner surface and positioned overlying the bobbin. The optical fiber pack is typically formed as a plurality of layers, with each layer comprising a spiral winding of an optical fiber cable. The bobbin and the optical fiber pack have different longitudinal coefficients of thermal expansion.

A thermal expansion accommodation layer (sometimes termed herein a "TEAL") lies between the bobbin and the optical fiber pack and contacts the outer surface of the bobbin and the inner surface of the optical fiber pack. The thermal expansion accommodation layer is made of a material that is readily deformable to accommodate the different longitudinal coefficients of thermal expansion of the optical fiber pack and the bobbin. The TEAL has a thickness dimension between the outer surface of the bobbin and the inner surface of the optical fiber pack sufficient to reduce any thermal stresses produced by the different longitudinal coefficients of thermal expansion to less than the failure strength of the optical fiber pack, and specifically the failure strength of an adhesive used in the optical fiber pack. For typical sizes of the bobbin and the optical fiber pack, the TEAL is at least about ⅛ inch thick.

The thermal expansion accommodation layer may be made of an isotropic material or an anisotropic material. The TEAL is preferably made at least in part of an elastomer, such as silicone rubber. To render the TEAL anisotropic, elongated hard fibers of a second phase may be added to the softer matrix material in an ordered arrangement. For example, if hard fibers are added so that their lengths extend primarily in the circumferential direction, the TEAL will have greater resistance to deformation and lower thermal expansion in the circumferential direction than in the longitudinal direction. Such controllable properties of the TEAL can be used to advantage to exert a stress on the fiber pack to resist its unconstrained deformation, when desired.

The optical fiber dispenser of the invention provides an important advance in the art by reducing the incidence of defects in the fiber pack that may adversely affect payout of the optical fiber cable in service. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
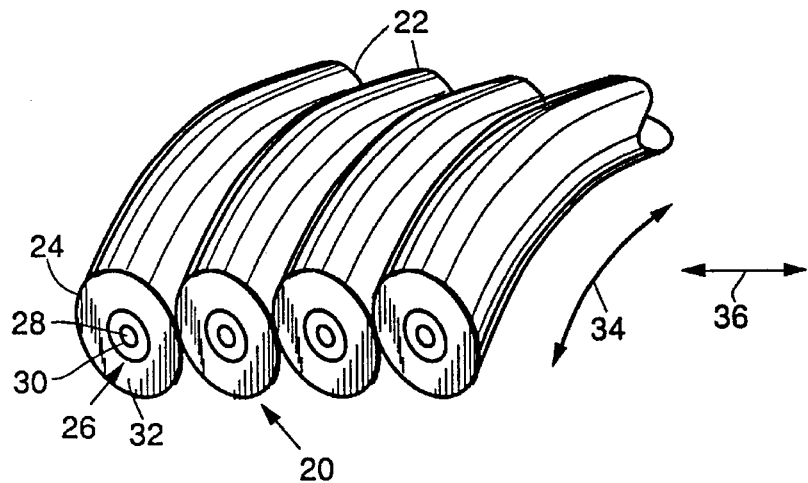
FIG. 1 is a perspective view of a portion of a layer of a wound optical fiber cable.

FIG. 1 depicts an optical fiber cable 20 that has been wound into a number of turns 22 in a single layer 24. This is the configuration of the optical fiber cable in the optical fiber dispenser, except that there are typically a plurality of layers, wound one over the other in the grooves of the preceding layer.

The optical fiber cable 20 includes an optical fiber 26 formed of a central core 28 and a cladding 30 overlying the core. The core 28 and the cladding 30 are glass, which has a relatively low coefficient of thermal expansion. An optical signal is carried along the core 28.

Overlying the optical fiber 26 is a buffer layer 32. The buffer layer 32 is formed of a polymeric material, having a relatively high coefficient of thermal expansion, that protects the optical fiber 26 from being scratched or otherwise damaged. In a typical instance, the outer diameter of the cladding 90 is about 125 micrometers, and the outer diameter of the buffer layer 82 is about 250 micrometers. Other sizes of optical fiber cables 20 are also known, and the use of the present invention is not limited to any particular size of cable.

The coefficient of thermal expansion of the optical fiber cable 20 is relatively low in the direction parallel to the length (direction of elongation) of the optical fiber 26, which is termed the circumferential direction 34 due to the manner in which the optical fiber cable 20 is held in the dispenser. The circumferential coefficient of thermal expansion is low because the thermal expansion is constrained by the expansion of the optical fiber 26. On the other hand, the thermal expansion of the optical fiber cable 20 is relatively large transverse to the length of the optical fiber 26, termed the longitudinal direction 36. The transverse coefficient of thermal expansion is large because it is dominated by the expansion of the buffer layer 32, and the glass of the optical fiber 26 does not constrain the longitudinal expansion and contraction.

Figure 2:
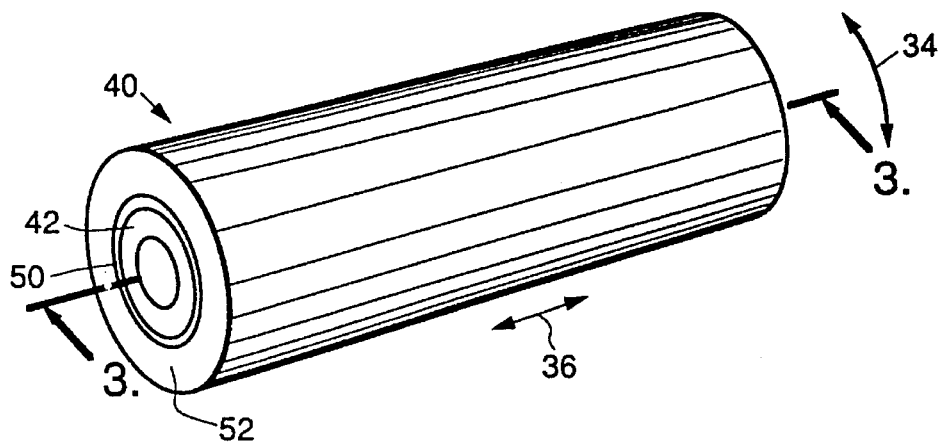
FIG. 2 is a perspective view of the optical fiber dispenser of the invention, with the attachment flange removed to show the interior structure.
Figure 3:
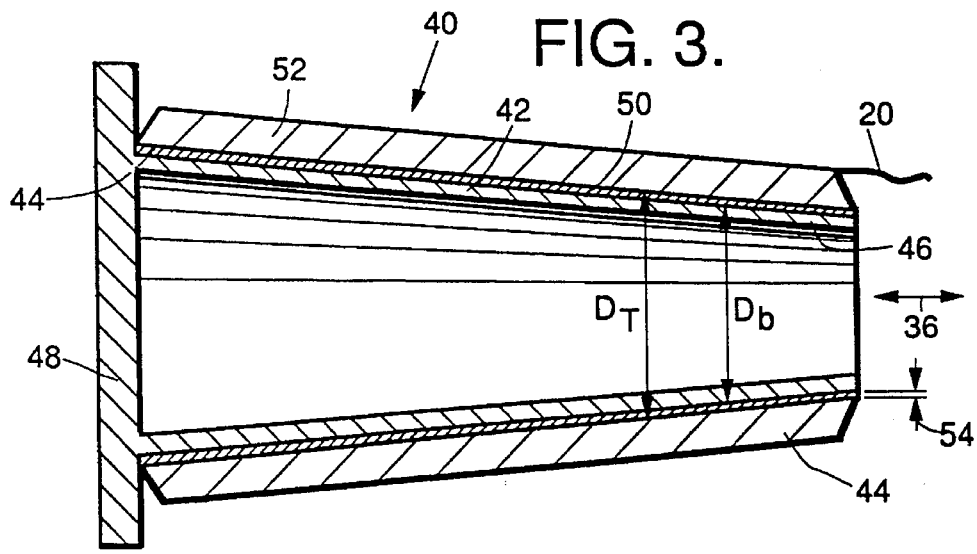
FIG. 3 is a schematic sectional view through the optical fiber dispenser, taken along lines 3—3 of FIG. 2, but with the attachment flange shown.

The anisotropy between the circumferential and longitudinal coefficients of thermal expansion of the optical fiber cable 20 plays a major role in the properties of a dispenser 40 of the optical fiber cable 20, shown in FIGS. 2 and 3. The dispenser 40 includes a bobbin 42 in the shape of a tapered, hollow cylinder. The bobbin 42 is typically tapered by about 1–3 degrees from a first end 44 toward a second end 46 (the taper is exaggerated in FIG. 3 for purposes of illustration), but the taper may be larger or smaller, or, in fact zero (in which case the bobbin is a straight-walled cylinder). The bobbin 42 has an outer diameter $D_b$ that varies along the length of the bobbin 42 according to the degree of taper. A flange 48 may be provided at the first end 44 to facilitate the attachment of the bobbin 42, and thence the entire dispenser 40, to a support (not shown). The flange is removed in FIG. 2 to show the structure of the remainder of the dispenser more clearly, but is depicted in FIG. 3.

A thermal expansion accommodation layer (also termed a TEAL) 50 overlies the bobbin 42. An inner diameter of the TEAL 50 is substantially the same as the outer diameter $D_b$ of the bobbin 42. The TEAL 50 has an outer diameter $D_T$. The size and material of construction of the TEAL 50 will be discussed in greater detail subsequently.

Overlying the TEAL 50 is an optical fiber pack 52. The optical fiber pack 52 is formed by winding a first layer of the optical fiber cable 20, generally with the form of the layer 24 of FIG. 1. A second layer of the optical fiber cable is wound over the first layer and lying in its groved interstices between the optical fiber turns, a third layer is wound over the second layer in a similar manner, and so on. A small amount of an adhesive is usually applied during the winding operation to cause the adjacent turns 22 to adhere together, and the adjacent layers 24 to adhere together. The adhesive causes the optical fiber pack 52 to behave as a coherent body, but also permits the individual turns and layers to be peeled away during payout of the optical fiber. There are typically 20 to 50 layers in an optical fiber pack, but packs have been prepared with as little as one layer and as many as 200 layers. The thermal expansion coefficient of the optical fiber pack 52 reflects the thermal expansion coefficient of the optical fiber cable 24 as discussed earlier. That is, the thermal expansion coefficient of the optical fiber pack 52 is relatively large in the longitudinal direction 36 and relatively small in the circumferential direction 34.

The bobbin 42 is made of a structurally strong material such as aluminum or a reinforced composite material. The bobbin must provide static support for the optical fiber pack 52, and must also resist the dynamic loads as the dispenser 40 is transported. The circumferential coefficient of thermal expansion of the bobbin 42 is typically equal to or larger than the circumferential coefficient of thermal expansion of the optical fiber pack 52. However, the longitudinal coefficient of thermal expansion of the bobbin 42 is typically much smaller than the longitudinal coefficient of thermal expansion of the optical fiber pack 52.

In the absence of the TEAL 50, this difference in the thermal expansion coefficients of the supporting structure (the bobbin 42) and the supported material (the optical fiber pack 52) may result in the formation of defects in the optical fiber pack 52 whenever the temperature is changed by a sufficiently large amount. Temperature changes can occur during fabrication of the dispenser 40, during storage, or during service. The defects occur because the optical fiber pack 52 seeks to expand or contract anisotropically according to its thermal expansion coefficients, but the constraining and supporting bobbin 42 expands or contracts anisotropically by a different amount. The defects include, for example, optical fiber cable pop-ups from the surface of the optical fiber pack 52, cracks in the optical fiber pack 52 due to failure of the adhesive, and inelastic straining of the adhesive. Any or all of these or other defects can result in an inability of the optical fiber cable 20 to pay out smoothly during service, which amounts to a defective dispenser. Even one such defect may render the optical fiber pack inoperable.

The thermal expansion accommodation layer 50 is made of a solid material that is readily deformable and accommodating to the different longitudinal coefficients of thermal expansion of the bobbin 42 and the optical fiber pack 52. Desirably, the TEAL 50 is made, at least in part, of an elastomeric material, or elastomer. An operable type of elastomer is a silicone polymer such as that available commercially as General Electric RTV11 or Dow Corning 3140. When the TEAL is made entirely of such a material, it is substantially isotropic in properties.

Alternatively, the TEAL may be made as a composite construction. In one example of such a construction, elongated, relatively rigid and hard structural fibers or filaments may be embedded into the relatively soft elastomer matrix. By preferentially orienting the fibers, the properties of the TEAL may be made anisotropic. That is, in a typical case the hard fibers would be oriented so that the elongated axis of each fiber lies parallel to the circumferential direction 34. The hard fibers could be an available reinforcement such as carbon or glass fibers. The structural fibers may be oriented in the TEAL by any suitable approach, such as, for example, rotating a mold relative to the bobbin in a circumferential direction with a mixture of liquid elastomer and fibers contained in the space between the mold and the bobbin. The matrix would preferably be the same material such as an elastomer discussed in relation to the isotropic TEAL. This orientation would increase the strength and decrease the coefficient of thermal expansion of the TEAL 50 in the circumferential direction, relative to the longitudinal direction 36. The properties of the TEAL would therefore be more closely matched to those of the optical fiber pack 52. The properties of the TEAL can be adjusted by selecting a particular type (i.e., material, size, geometry) of fiber, a particular type of matrix, the orientation of the fibers in the matrix, and the volume fraction of fibers in the composite construction.

The TEAL must have a thickness 54 between the outer surface of the bobbin 42 and the inner surface of the optical fiber pack 52 sufficient to reduce any thermal stresses produced by the different longitudinal coefficients of thermal expansion to less than the failure strength of the optical fiber pack, and specifically the failure strength of the adhesive used in the optical fiber pack. The exact value of the minimum thickness 54 depends upon the diameter and wall thickness of the bobbin 42, the dimensions and properties of the optical fiber pack 52, the size and material properties of the TEAL 50, and the maximum range of temperatures experienced by the dispenser 40. However, in practice it has been found that, for a typical dispenser, a minimum thickness of about ⅛ of an inch is required in order to provide sufficient shear accommodation to reduce the strains experienced in the longitudinal direction 95 of the optical fiber pack 52 by a sufficient amount that any remaining stresses are too small to produce defects in the optical fiber pack. If the thickness 54 is substantially below this value, the thermally induced stresses are reduced, but not sufficiently that defect production is suppressed.

There is no maximum thickness 54 that must be maintained for the sake of stress reduction. However, as the thickness 54 of the TEAL 50 becomes larger, the rigidity of support of the optical fiber pack 52 is lessened, so that tension variations in the fiber pack may become excessive and the pack may become unstable. Thus, preferably, the maximum thickness 54 of the TEAL 50, for a typical fiber pack, is less than about ¾ inch.

The use of the TEAL 50 provides benefits in addition to reduction of thermal stresses and reduction of defects in the optical fiber pack. By adjusting the properties of the TEAL, the stress state of the optical fiber pack can be controlled. These stresses can influence the stability of the optical fiber pack and the payout properties of the optical fiber cable. The TEAL also acts to some extent as a shock absorber to cushion the optical fiber pack against shocks that might be imparted to the supporting structure during fabrication, transporting, storage, and service. For example, if the support structure is accidentally dropped during transporting, the TEAL will lessen the shock transmitted to the optical fiber pack.

Figure 4:
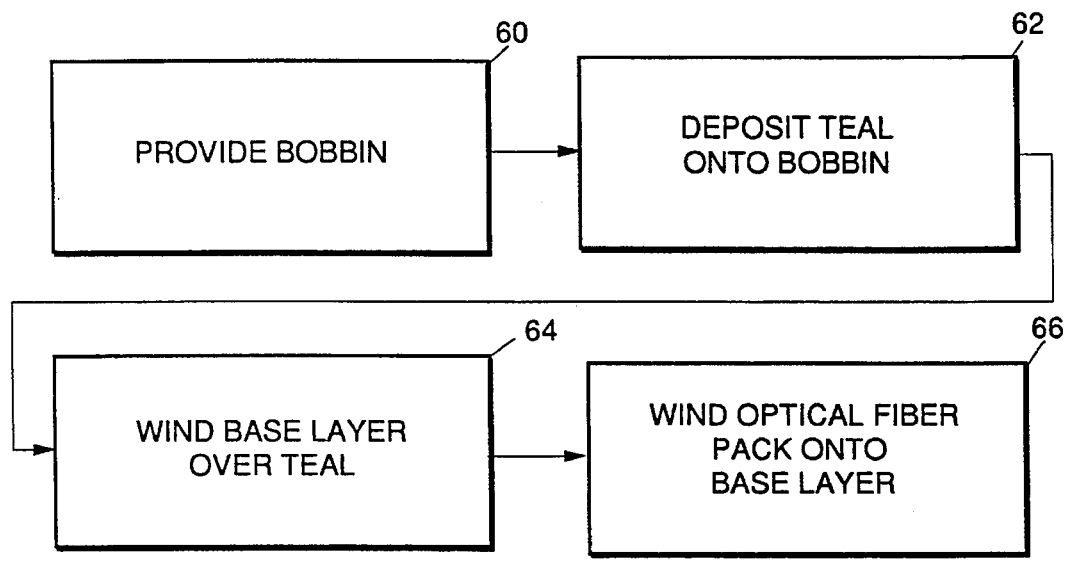
FIG. 4 is a process flow diagram of a first method for the preparation of the optical fiber dispenser.
Figure 5:
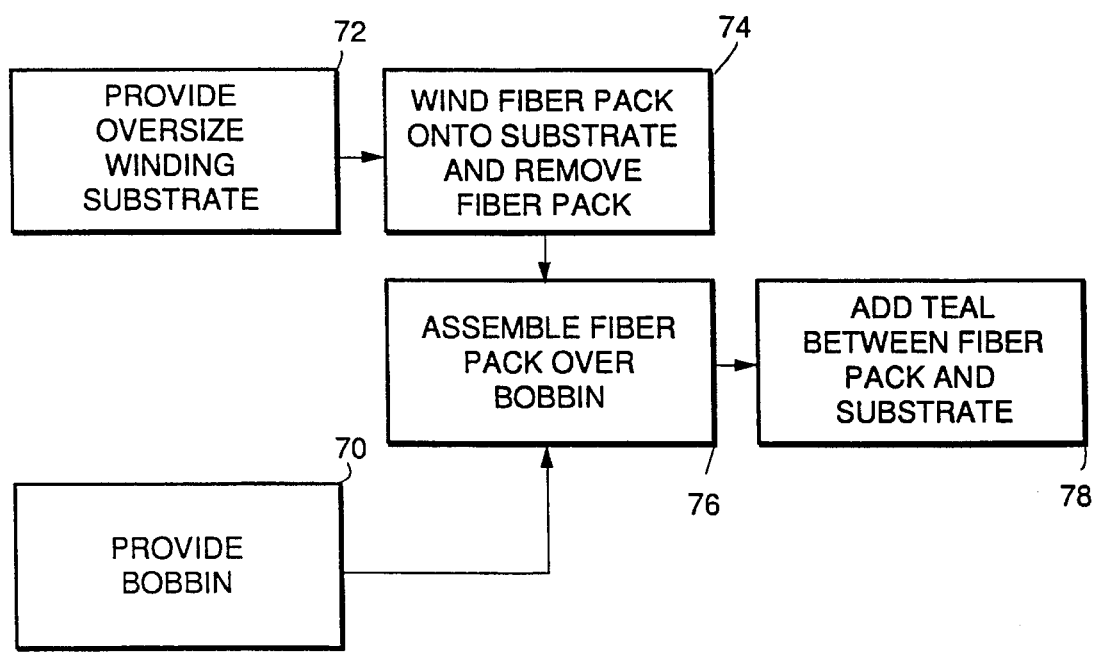
FIG. 5 is a process flow diagram of a second method for the preparation of the optical fiber dispenser.

The dispenser 40 can be produced in many different ways, and FIGS. 4 and 5 depict two preferred fabrication approaches by way of example. In a direct buildup approach shown in FIG. 4, the bobbin 42 is provided, numeral 60. The bobbin is prepared ill a conventional manner, such as by machining the tapered cylinder from aluminum tube stock or by filament winding and curing of a composite material. The thermal expansion accommodation layer 50 is deposited on the bobbin 42, numeral 62. The silicone elastomer such as General Electric RTV11 is available commercially in unpolymerized liquid form. A mold that defines the desired TEAL thickness 54 is placed around the bobbin 42, and the liquid elastomer is poured into the form. Alternatively, the TEAL material may be deposited upon the bobbin by a series of standard dip coating steps. After it is applied to the bobbin, the liquid elastomer is cured to form a solid polymer in the conventional manner as recommended by the manufacturer. After the TEAL is cured to the solid form, a base layer, typically made of steel wire, is wound over the TEAL, numeral 64. The optical fiber cable is wound onto the base layer to form the optical fiber pack 52, numeral 66.

An alternative approach is depicted in FIG. 5. The bobbin is provided, numeral 70, in the conventional manner. The optical fiber pack is prepared as a separate, freestanding unit by first providing an oversize winding substrate, numeral 72. The winding substrate has the same shape as the bobbin, but is larger in internal cylindrical diameter than the outer diameter of the bobbin by twice the amount of the TEAL thickness 54. The winding substrate is coated with a release agent. The optical fiber cable is wound onto the oversize substrate, numeral 74, using the desired final winding arrangement and adhesive to form the optical fiber pack 52. The optical fiber pack 52 is removed from the winding substrate, and assembled over the bobbin, numeral 76. That is, the bobbin is centered within the central cavity of the optical fiber pack 52 using tooling, leaving a uniform gap between the bobbin and the optical fiber pack 52. The liquid precursor of the desired solid TEAL material is poured into the gap between the bobbin and the optical fiber pack 52 and thereafter cured, numeral 78. Thus, the optical fiber pack 52 acts as the female mold cavity for the shaping of the TEAL 50. With this alternative fabrication approach, it may not be necessary to provide a base layer, because the TEAL material flows and molds around the first fiber layer to serve the same function as the base layer.

Any other of several possible approaches consistent with the desired final structure can also be used to prepare the dispenser 40.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical fiber dispenser, comprising:
  a tapered cylindrical bobbin having an outer surface;

an optical fiber pack having an inner surface and positioned overlying the bobbin, the bobbin and the optical fiber pack having different longitudinal coefficients of thermal expansion; and a thermal expansion accommodation layer lying between the bobbin and the optical fiber pack and contacting the outer surface of the bobbin and the inner surface of the optical fiber pack, the thermal expansion accommodation layer being made of a material that is readily deformable to accommodate the different longitudinal coefficients of thermal expansion and having a thickness dimension between the outer surface of the bobbin and the inner surface of the optical fiber pack sufficient to reduce any thermal stresses produced by the different longitudinal coefficients of thermal expansion to less than the failure strength of the optical fiber pack.

2. The optical fiber dispenser of claim 1, wherein the optical fiber pack comprises a plurality of layers, each layer comprising a spiral winding of an optical fiber.

3. The optical fiber dispenser of claim 1, wherein the thermal expansion accommodation layer is made of an isotropic material.

4. The optical fiber dispenser of claim 1, wherein the thermal expansion accommodation layer is made of an anisotropic material.

5. The optical fiber dispenser of claim 1, wherein the thermal expansion accommodation layer has a thickness dimension of at least about 1/8 inch.

6. The optical fiber dispenser of claim 1, wherein the thermal expansion accommodation layer is made at least in part of an elastomer.

7. The optical fiber dispenser of claim 1, wherein the thermal expansion accommodation layer comprises a silicone polymer.

8. The optical fiber dispenser of claim 1, wherein the thermal expansion accommodation layer is made of a composite of harder fibers embedded in a softer matrix.

9. The optical fiber dispenser of claim 8, wherein the fibers are directionally oriented in the matrix.

10. An optical fiber dispenser, comprising:

a tapered cylindrical bobbin having an outer surface;

an annular optical fiber pack having an inner surface and positioned overlying the bobbin, the bobbin and the optical fiber pack having different longitudinal coefficients of thermal expansion; and a thermal expansion accommodation layer lying between the bobbin and the optical fiber pack and contacting the outer surface of the bobbin and the inner surface of the optical fiber pack, the thermal expansion accommodation layer being made at least in part of an elastomer and having a thickness dimension between the outer surface of the bobbin and the inner surface of the optical fiber pack of at least about 1/8 inch.

11. The optical fiber dispenser of claim 10, wherein the thermal expansion accommodation layer is made of an isotropic material.

12. The optical fiber dispenser of claim 10, wherein the thermal expansion accommodation layer comprises a silicone polymer.

13. The optical fiber dispenser of claim 10, wherein the thermal expansion accommodation layer is made of an anisotropic material.

14. The optical fiber dispenser of claim 10, wherein the thermal expansion accommodation layer is made of a composite of harder fibers embedded in an elastomer matrix.

15. The optical fiber dispenser of claim 14, wherein the fibers are directionally oriented in the elastomer.

* * * * *